(No Model.)

J. WHITE.
BALE TIE.

No. 297,208. Patented Apr. 22, 1884.

WITNESSES
Wm. M. Monroe.
Geo. W. King

INVENTOR
Joseph White
by
Leggett & Leggett.
Attorneys

UNITED STATES PATENT OFFICE.

JOSEPH WHITE, OF CLEVELAND, OHIO, ASSIGNOR TO THE TYLER BALE TIE COMPANY, OF SAME PLACE.

BALE-TIE.

SPECIFICATION forming part of Letters Patent No. 297,208, dated April 22, 1884.

Application filed February 12, 1884. (No model.)

*To all whom it may concern:*

Be it known that I, JOSEPH WHITE, of Cleveland, in the county of Cuyahoga and State of Ohio, have invented certain new and useful Improvements in Bale-Ties; and I do hereby declare the following to be a full, clear, and exact description of the invention, such as will enable others skilled in the art to which it pertains to make and use the same.

My invention relates to improvements in bale-ties; and it consists in certain features of construction and in combination of parts hereinafter described, and pointed out in the claim.

Figure 1:
Figure 2:
Figure 3:
Figure 4:
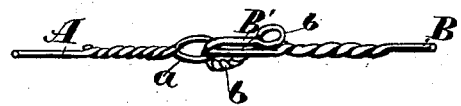
Figure 5:

In the accompanying drawings, Figure 1 shows a loop on the end of a wire and forming one portion of my improved bale-tie. Fig. 2 shows the other portion of the bale-tie in one stage of construction. Fig. 3 shows the completed tie. Fig. 4 shows the tie after it has been subjected to a tensile strain. Fig. 5 shows a modification of the part shown in Fig. 2.

The wire A is doubled back, leaving the loop $a$ and the parts twisted together, as shown in Fig. 1. The wire B is bent back and twisted together in two places, so as to form the loop B', the loop $b$, and the shank $b'$ between the loops, as shown in Fig. 2. Next, the twisted shank $b'$ is bent back and the loop $b$ thrust through the loop B', as shown in Fig. 3. The loop $a$ is intermediate in size between the loops B' and $b$. In locking the tie, the loop $a$ is passed through the loop B' in the same direction that the shank $b'$ passes through it, and is passed over the loop $b$ and drawn back to the position shown in Fig. 3, where it engages the bent portion of the shank. When a tensile strain is brought to bear on the tie, the sides of the loop B' are straightened and brought toward each other, causing them to embrace the shank $b'$ just back of the loop $b$, in which position it would be impossible to draw the tie asunder, except by breaking the wires. By means of the twisted shank $b'$ the loop B' is confined to given limits, and cannot be enlarged by spreading of the wires of the shank when the tensile strain is brought to bear, as would be the case if the wires of the shank were not twisted. In that case the sides of the loop B' would be partially straightened, but the short reverse bends, where the loop joins the shank, would also straighten more or less, causing the wires of the shank to separate, and would thus enlarge the loop B'.

The widening or enlargement of the end of the shank $b'$ is preferably by means of the loop $b$, although the wire might be cut at this part and bent in opposite directions, as shown at $b^2$ in Fig. 5; or the wires might be bent in a variety of forms to accomplish the same result—to wit, an enlargement or broadening of the end of the shank.

What I claim is—

In a wire bale-tie one end of which is provided with the loops $b$ and B' and intermediate shank, $b'$, the said loop $b$ being passed through the loop B', forming a hook, while the opposite end thereof is provided with a single loop, $a$, which latter is adapted to be passed through the loop B' over the loop $b$, and rest against the hook formed by the shank $b'$, all of the above parts operating as described.

In testimony whereof I sign this specification, in the presence of two witnesses, this 8th day of February, 1884.

JOSEPH WHITE.

Witnesses:
CHAS. H. DORER,
GEO. W. KING.